United States Patent
DeLuca et al.

(10) Patent No.: US 11,291,077 B2
(45) Date of Patent: Mar. 29, 2022

(54) INTERNET OF THINGS SENSOR MAJOR AND MINOR EVENT BLOCKCHAIN DECISIONING

(71) Applicant: INTERNATIONAL BUSINESS MACHINES CORPORATION, Armonk, NY (US)

(72) Inventors: Lisa Seacat DeLuca, Baltimore, MD (US); Joseph G. Berti, Highlands Ranch, CO (US)

(73) Assignee: International Business Machines Corporation, Armonk, NY (US)

(*) Notice: Subject to any disclaimer, the term of this patent is extended or adjusted under 35 U.S.C. 154(b) by 16 days.

(21) Appl. No.: 16/693,597

(22) Filed: Nov. 25, 2019

(65) Prior Publication Data

US 2021/0160961 A1   May 27, 2021

(51) Int. Cl.
H04W 84/18 (2009.01)
G06F 16/903 (2019.01)
H04L 9/06 (2006.01)

(52) U.S. Cl.
CPC ......... *H04W 84/18* (2013.01); *G06F 16/903* (2019.01); *H04L 9/0643* (2013.01); *H04L 2209/38* (2013.01)

(58) Field of Classification Search
None
See application file for complete search history.

(56) References Cited

U.S. PATENT DOCUMENTS

| 5,867,823 | A | 2/1999 | Richardson |
| 6,691,064 | B2 | 2/2004 | Vroman |
| 9,246,756 | B2 | 1/2016 | Jessee et al. |
| 9,639,820 | B2* | 5/2017 | Singh .................. H04L 67/12 |
| 9,984,344 | B2* | 5/2018 | Singh ............... G06Q 10/0635 |
| 10,001,759 | B2* | 6/2018 | Gupta .................. H04W 4/70 |
| 10,074,402 | B2 | 9/2018 | Mahate et al. |
| 10,305,734 | B2 | 5/2019 | Dost et al. |
| 10,404,569 | B2* | 9/2019 | Hershey ............ H04L 43/067 |

(Continued)

FOREIGN PATENT DOCUMENTS

| CN | 101256404 A | 9/2008 |
| CN | 108881474 A | 11/2018 |

(Continued)

OTHER PUBLICATIONS

Adil et al., "Digital Twin: Values, Challenges and Enablers", Publication date Oct. 3, 2019, arXiV:1910.01719v1 [eess.SP], pp. 1-31. (Year: 2019).*

(Continued)

*Primary Examiner* — Tri H Phan
(74) *Attorney, Agent, or Firm* — Robert D. Bean

(57) ABSTRACT

A method, computer system, and a computer program product for qualifying an Internet of Things (IoT) event as a major event is provided. The present invention may include detecting the IoT event by utilizing one or more IoT sensors associated with a physical asset. The present invention may then include comparing the detected IoT event with one or more owner preferences associated the physical asset. The present invention may further include qualifying the compared IoT event as a major event based on the detected IoT event matching the one or more owner preferences.

18 Claims, 6 Drawing Sheets

(56) References Cited

U.S. PATENT DOCUMENTS

| | | | |
|---|---|---|---|
| 10,522,854 | B2 | 12/2019 | Wang |
| 10,785,307 | B2 * | 9/2020 | DeLuca .................. H04W 4/02 |
| 10,887,082 | B2 * | 1/2021 | Chamarajnager ....... H04W 4/38 |
| 10,958,552 | B2 * | 3/2021 | Ly ........................... H04W 4/38 |
| 10,984,122 | B2 * | 4/2021 | Thomas .................. G06F 21/64 |
| 11,012,228 | B2 * | 5/2021 | Mercuri .................. G06F 9/546 |
| 2004/0176929 | A1 | 9/2004 | Joubert et al. |
| 2014/0100158 | A1 | 4/2014 | Castel et al. |
| 2016/0247129 | A1 | 8/2016 | Song |
| 2017/0140580 | A1 | 5/2017 | Marr |
| 2017/0171705 | A1 | 6/2017 | Bordash et al. |
| 2018/0054376 | A1 * | 2/2018 | Hershey .................. H04L 12/66 |
| 2018/0094953 | A1 | 4/2018 | Colson et al. |
| 2018/0096175 | A1 | 4/2018 | Schmeling et al. |
| 2018/0139056 | A1 | 5/2018 | Imai et al. |
| 2018/0210436 | A1 | 7/2018 | Burd |
| 2019/0019090 | A1 | 1/2019 | Chacko et al. |
| 2019/0087544 | A1 | 3/2019 | Peterson |
| 2019/0098015 | A1 | 3/2019 | Hookham-Miller |
| 2019/0098113 | A1 | 3/2019 | Park et al. |
| 2019/0121334 | A1 | 4/2019 | Song et al. |
| 2019/0138662 | A1 | 5/2019 | Deutsch et al. |
| 2019/0138667 | A1 | 5/2019 | Benesh et al. |
| 2019/0138970 | A1 | 5/2019 | Deutsch |
| 2019/0147412 | A1 | 5/2019 | Chiaramonte et al. |
| 2019/0158270 | A1 | 5/2019 | Berti |
| 2019/0339688 | A1 | 11/2019 | Cella |
| 2019/0349426 | A1 * | 11/2019 | Smith .................... H04L 67/104 |
| 2020/0137102 | A1 * | 4/2020 | Sheridan ................. H04L 41/28 |
| 2021/0067591 | A1 * | 3/2021 | Ly ............................ H04W 4/70 |
| 2021/0158174 | A1 | 5/2021 | Deluca |
| 2021/0158242 | A1 | 5/2021 | Berti |
| 2021/0158307 | A1 | 5/2021 | Deluca |
| 2021/0192413 | A1 | 6/2021 | Shirazipour |
| 2021/0357422 | A1 * | 11/2021 | Cella .................... G06K 9/6256 |

FOREIGN PATENT DOCUMENTS

| | | |
|---|---|---|
| EP | 0908805 A1 | 4/1999 |
| WO | 2018183275 A1 | 10/2018 |
| WO | 2018234741 A1 | 12/2018 |
| WO | 2019010068 A1 | 1/2019 |

OTHER PUBLICATIONS

Mell et al., "The NIST Definition of Cloud Computing", Recommendations of the National Institute of Standards and Technology, NIST Special Publication 800-145, Sep. 2011, 7 pages.

Tao et al., "Digital twin-driven product design, manufacturing and service with big data", Int. J. Adv. Manuf. Technol., Mar. 16, 2017, 15 pages.

Nuss et al., "Towards Blockchain-Based Identity and Access Management for Internet of Things in Enterprises", International Conference on Trust and Privacy in Digital Business, Jul. 27, 2018, pp. 167-181.

Albano et al., "Blockchain Technology Helps Maintenance to Stop Climate Change", Conference Paper, Cister Research Centre in Real-Time & Embedded Computing Systems, CISTER-TR-180702, Jun. 21, 2018, 10 pages.

Gutierrez, "Boeing Improves Operations with Blockchain and the Internet of Things", Altoros Blog, May 24, 2017, 12 pages, https://www.altoros.com/blog/author/carlo/.

Hegadekatti, "Automation Processes and Blockchain Systems", MPRA, Munich Personal RePEc Archive, Feb. 6, 2017, pp. 1-8.

Youtube, "IoT, Blockchain, and Avionics a Demonstration", IBM Watson Internet of Things, Jan. 10, 2017, 2 pages.

Madhwal et al., "Blockchain and Supply Chain Management: Aircrafts' Parts' Business Case", 28th DAAAM International Symposium on Intelligent Manufacturing and Automation, (2017), pp. 1051-1056.

De'shazer, "Proof: Blockchain-based Asset Management For Business", YouTube, Nov. 14, 2016, 2 pages.

Rajkov, "Blockchain for Aircraft Spare Part Management: Evaluating the Robustness of the Maintenance, Repair and Overhaul Business Model", Accenture Strategy, TUDelft, Master thesis submitted to Delft University of Technology in partial fulfillment of the requirements for the degree of Master of Science in Management of Technology, Sep. 20, 2018, 99 pages.

Riddle & Code, "How to Use the Digital Twin Technology Work Package", printed Jun. 27, 2019, 6 pages, https://www.riddleandcode.com/poc/.

Viswanadham, "Disruption Is Here to Stay—Are You Prepared?", Celerity, Feb. 2017, 3 pages.

Laplante et al., "Solving Quality and Maintenance Problems with AI, Combining Machine Learning, Deep Learning, and Associative Memory Reasoning to Improve Operations", O'Reilly®, Apr. 2018, 35 pages.

Parris, "Minds + Machines: Meet A Digital Twin", GE Digital, YouTube, Nov. 18, 2016, 2 pages.

IBM: List of IBM Patents or Patent Applications Treated as Related (Appendix P), Nov. 27, 2019, pp. 1-2.

Pending U.S. Appl. No. 16/693,621, filed Nov. 25, 2019, entitled: "Digital Twin Article Recommendation Consultation", 37 pages.

Pending U.S. Appl. No. 16/693,545, filed Nov. 25, 2019, entitled: "Blockchain Ledger Entry Upon Maintenance of Asset and Anomaly Detection Correction", 42 pages.

Pending U.S. Appl. No. 16/693,575, filed Nov. 25, 2019, entitled: "Equipment Maintenance Assistant Training Based on Digital Twin Resources", 41 pages.

* cited by examiner

INTERNET OF THINGS SENSOR MAJOR AND MINOR EVENT BLOCKCHAIN DECISIONING

BACKGROUND

The present invention relates generally to the field of computing, and more particularly to digital twin technology.

A digital twin is a digital representation of a physical asset, which may include various shapes and sizes. Similar to a human twin, the digital twin may be born at the same time as the physical asset with similar base features as the initial asset. It then grows over time to mimic the experiences of the physical asset. The digital twin, however, may live on the cloud and could become separated from the real-life asset.

SUMMARY

Embodiments of the present invention disclose a method, computer system, and a computer program product for qualifying an Internet of Things (IoT) event as a major event. Embodiments of the present invention may include detecting the IoT event by utilizing one or more IoT sensors associated with a physical asset. The present invention may then include comparing the detected IoT event with one or more owner preferences associated the physical asset. The present invention may further include qualifying the compared IoT event as a major event based on the detected IoT event matching the one or more owner preferences.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
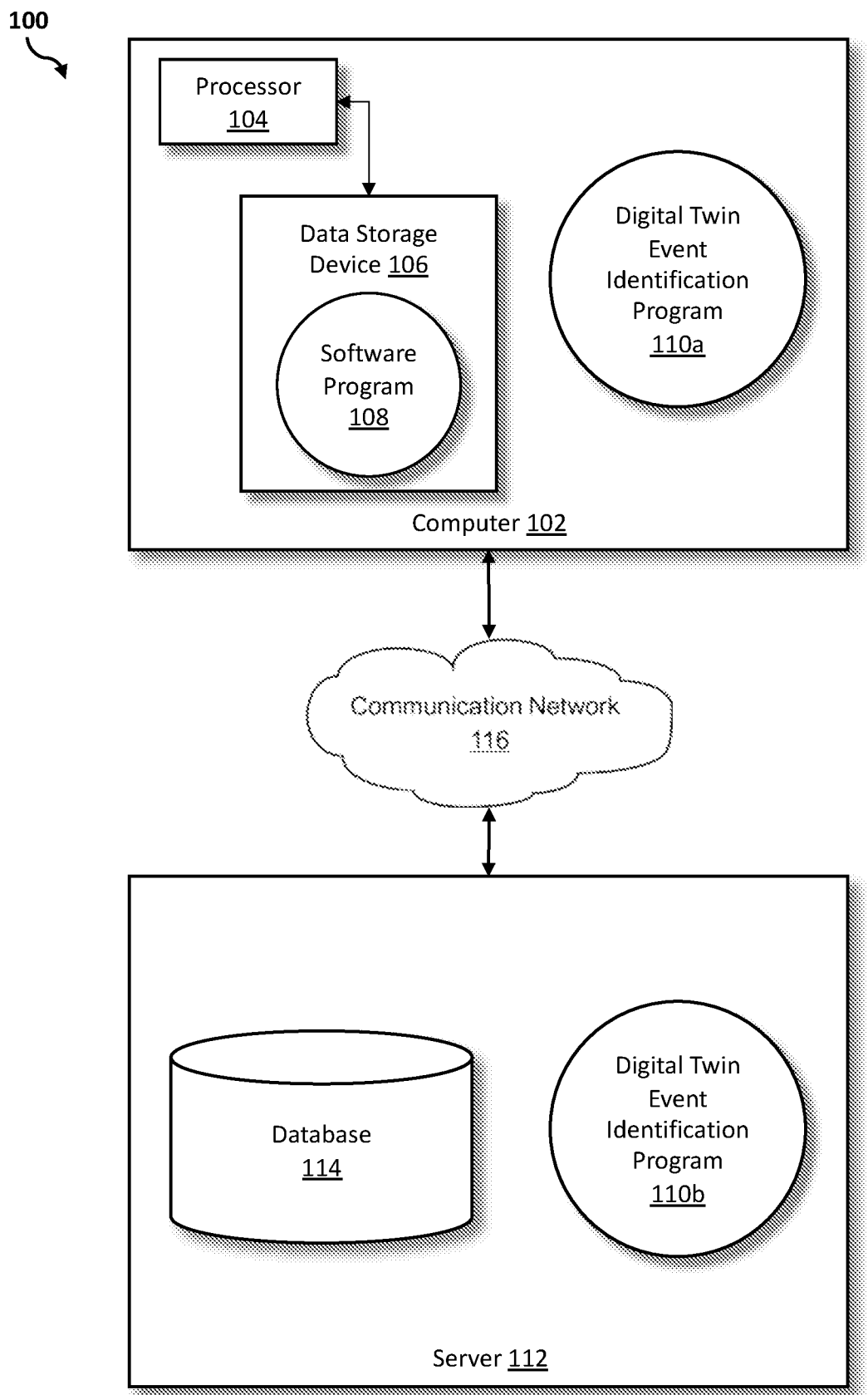
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method and program product for qualifying an Internet of Things (IoT) event as a major event. As such, embodiments of the present invention have the capacity to improve the technical field of digital twin technology by classifying an Internet of Things (IoT) event as minor or major event. More specifically, the digital twin event identification program may initiate a digital twin in which one or more IoT sensors are associated with a physical asset and one or more owner preferences on when to trigger the detection of an event. The digital twin event identification program may then detect an IoT event. The digital twin event identification program may then determine whether the IoT event matches one or more owner preferences. If, one or more owner preferences are not matched, then the default choice is set, and if, however, one or more owner preferences are matched, then the preferred capture decision is performed thereby qualifying that the IoT event as a major event.

As previously described, a digital twin is a digital representation of a physical asset, which may include various shapes and sizes. Similar to a human twin, the digital twin may be born at the same time as the physical asset with similar base features as the initial asset. It then grows over time to mimic the experiences of the physical asset. The digital twin, however, may live on the cloud and could become separated from the real-life asset.

Additionally, the digital twin may include multiple digital twins for a physical asset in which one or more minimum digital twins may be utilized to support more complex digital twins, such as ones that capture Internet of Things (IoT) sensor events.

However, an IoT sensor event may occur every second or even faster thereby causing a large amount of writes to a database or blockchain. Therefore, it may be advantageous to, among other things, identify major IoT sensor events that may qualify for a blockchain write, which may be performed easily by utilizing the criticality of the part or the physical asset. Additionally, the digital twin event identification program may trigger the writing of a new block upon the completion of a maintenance or part service request using IoT sensor readings.

According to at least one embodiment, the digital twin event identification program may be utilized to determine whether an IoT sensor event qualifies as a minor or major IoT sensor event that may be captured and stored on the blockchain, or saved on a traditional database.

According to at least one embodiment, the digital twin event identification program may include multiple previously determined and implemented preferences. First, a physical asset (i.e., asset) may be associated with a digital twin, and the physical asset may include a marker (e.g., radio frequency identification (RFID) tag, quick response (QR) code, Bluetooth® tag (Bluetooth and all Bluetooth-based trademarks and logos are trademarks or registered trademarks of Bluetooth SIG, Inc. and/or its affiliates), asset tag) that enables access to a digital twin vault (i.e., digital twin repository) that includes a particular record for the instance of the physical asset. The physical asset may also include one or more IoT sensors (i.e., IoT equipped devices with sensors) for monitoring the status of the physical asset (e.g., current health of the asset, current on/off of parts within the asset, unique identifiers of parts associated with the asset (i.e., Bill of Materials), historical usage of the asset, predicted maintenance for the asset).

According to at least one embodiment, the IoT sensors associated with the physical asset may be utilized to determine an IoT sensor event, which may include recommend a possible part for replacement, anomaly in how a part or the asset is running, and preventative maintenance, as well as predict likelihood of a failure.

In the present embodiment, the digital twin may be initiated (or activated) to capture IoT sensor events to mimic digitally the real-life events of the physical asset. The IoT sensor events may include on/off triggers, threshold sensor readings (e.g., temperature is above 90 degrees Fahrenheit), location events (e.g., entry/exit/dwell events for a particular location using micro-location or global positioning system (GPS)), failure events, predicted failures (e.g., using artificial intelligence (AI) or machine learning through solutions), anomaly to a predicted sensor reading, and/or criticality score. The present embodiment may further include the digital twin user (e.g., buyer, manufacturer, end user, supplier within the stream of commerce) sets up (or input) a number of preferences (i.e., owner preferences) for when the IoT sensor events may be captured in a blockchain, a traditional database, a batch collected for future archival, and/or be ignored.

According to at least one embodiment, the digital twin event identification program may be based on the criticality of the part. As such, a part that may be more expensive or is set to be more critical in the operation of the digital twin event identification program that may be utilized as a decision point for whether or not to write to the blockchain. In the present embodiment, the criticality model of a part, which may be rule-based, may be set by a buyer, recommended by a manufacturer, and/or modeled by an external third party.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a digital twin event identification program 110a. The networked computer environment 100 may also include a server 112 that is enabled to run a digital twin event identification program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the digital twin event identification program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the digital twin event identification program 110a, 110b (respectively) to classifying an Internet of Things (IoT) event as minor or major, and further determining whether to store the IoT event in a blockchain structure or traditional database. The digital twin event identification method is explained in more detail below with respect to FIGS. 2 and 3.

Figure 2:
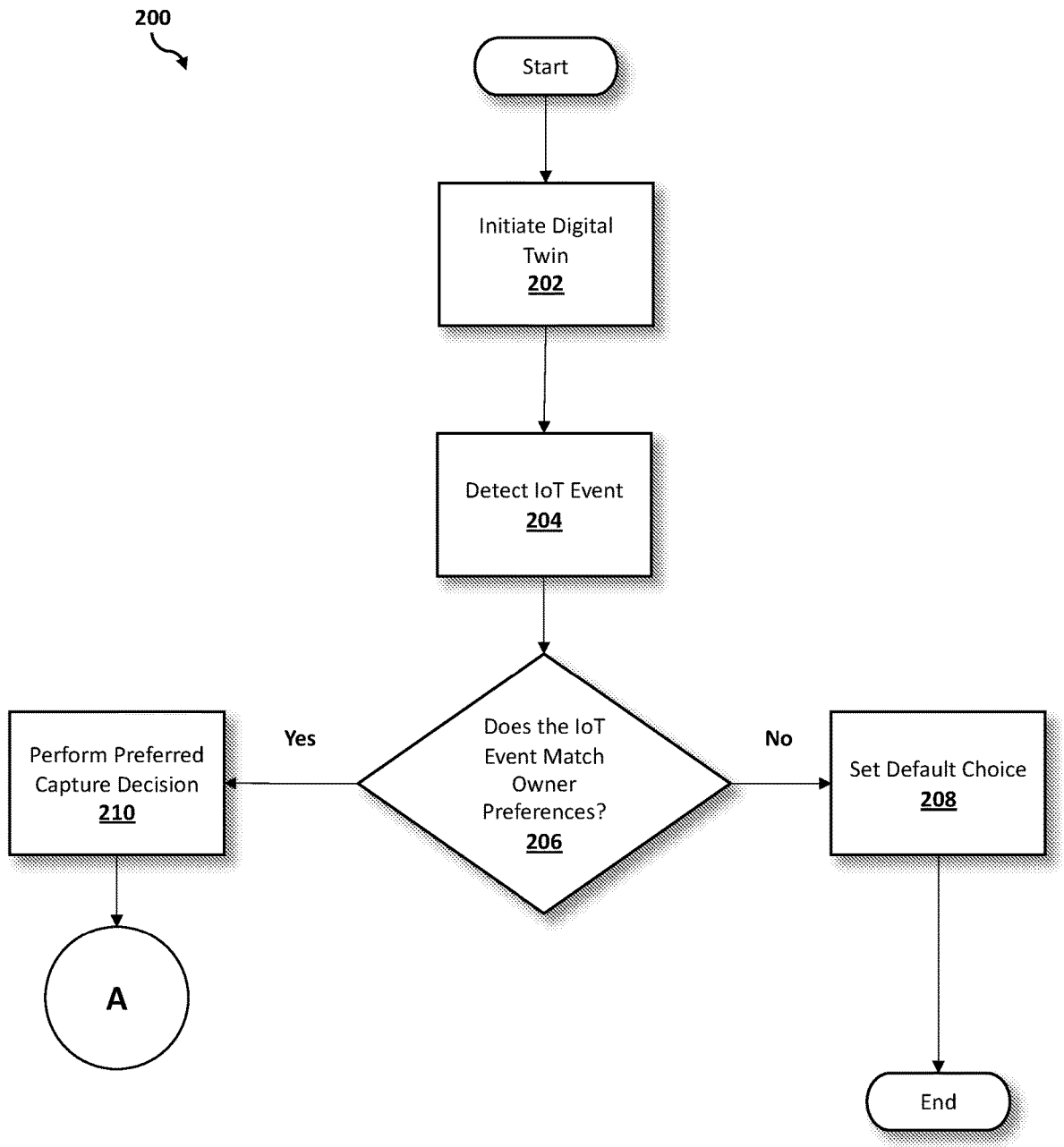
FIG. 2 is an operational flowchart illustrating a process for determining an event associated with a digital twin according to at least one embodiment.

Referring now to FIG. 2, an operational flowchart illustrating the exemplary digital twin event determination process 200 used by the digital twin event identification program 110a, 110b according to at least one embodiment is depicted.

At 202, the digital twin is initiated. Prior to the digital twin event determination process 200, a marker (or a tag) may be include within a physical asset (i.e., asset) that allows access to a digital twin repository (i.e., digital twin vault) with a specific record for the asset. Using a software program 108 on the user's device (e.g., user's computer 102), the marker associated with a physical asset may be transmitted as input into the digital twin event identification program 110a, 110b via the communication network 116 to identify the digital twin associated with the asset. The digital twin may be initiated (or activated) to capture (or monitor) IoT sensor events to mimic digitally the real-life events of the asset. As such, any data generated on the asset may be saved as part of the digital twin.

In the present embodiment, at least one Internet of Things (IoT) sensor (or IoT equipped device with sensors) may be associated with the physical asset (i.e., asset). The IoT sensor may continuously monitor a current health of the asset, a current on/off of parts within the asset, a unique identifier (or set of unique identifiers) of parts that make up the asset, a historical usage of the asset, a predicted maintenance for the asset, and other digital twin associated with the function and performance of the asset. In at least one embodiment, the IoT sensors may determine whether a part should be replaced, an anomaly in how a part or asset is running, a recommended preventative maintenance, and a prediction on failures of the parts associated with the asset (i.e., asset parts).

In at least one embodiment, the tag or marker associated with the physical asset may include a radio frequency identification (RFID) tag, a quick response (QR) code, a Bluetooth® tag, or an asset tag. An asset tag or asset label, for example, may include a barcode that may be read by an individual or barcode scanner in which stored information or data may be retrieved or new data may be recorded.

In at least one embodiment, the digital twin owner may set up a number of preferences (i.e., owner preferences) to trigger the capture of certain events by an IoT sensor associated with the asset within a blockchain, a traditional database, a batch collected for future archival, and/or be ignored. In at least one other embodiment, the owner preferences may determine whether an event is major or minor as identified by the owner. The identification of the event as minor or major may be further utilized to determine whether the event should be saved in a blockchain structure, a traditional database, or an alternate storage medium.

In at least one embodiment, the digital twin may include various types of content (i.e., data) such as user manuals, owner manuals, Bill of Materials and part lists, warranty, maintenance plans, inventory plans, asset specifications, three-dimensional (3D) models, computer-aided designs (CAD) drawings, fault codes, scheduled maintenance plans, operating manuals, usage (e.g., Internet of Things (IoT) sensor readings), artificial intelligence/prediction models, historical operating system, historical maintenance records, owner information, and change of ownership information.

For example, Chiller A recently came online at a Manufacturing Plant A that producing popsicles. Chiller A includes two IoT enabled sensors, namely a temperature sensor that continuously monitors the temperature inside the chiller, and a water presence sensor that continuously monitors whether there is an increase in the amount of water in Chiller A. The data generated by the temperature and water sensors are reported to the digital twin event identification program 110a, 110b. Manufacturing Plant A enables the digital twin associated with Chiller A (Digital Twin A) such that the IoT sensor data generated by Chiller A will be saved as part of Digital Twin A.

Next, at 204, an IoT event is detected. The IoT sensors associated with the asset may determine that an IoT event has occurred. Using a software program 108, the IoT sensors may transmit, as input, a digital twin associated with the determined IoT event to the digital twin event identification program 110a, 110b via the communication network 116. If the IoT sensors associated with the asset reports a change in the IoT sensor readings, the digital twin event identification program 110a, 110b may determine that an IoT event has occurred.

In at least one embodiment, the IoT events (i.e., IoT sensor events, or events) may include on/off triggers, a threshold sensor reading (e.g., temperature equal to or below 50 degrees Fahrenheit), a location event (e.g., entry/exit/dwell events for a particular location using micro-location or global positioning system (GPS), predicted failures (e.g., using artificial intelligence (AI) and machine learning (ML) through solutions), an anomaly to a predicted sensor reading, and/or a criticality score (i.e., urgency score).

In at least one embodiment, to compute the urgency score, the digital twin event identification program 110a, 110b may utilize a parsing engine to search through the digital twin resources within the digital twin repository to identify relevant data based on key words to identify features (e.g., relevant data) associated with the physical asset by comparing the IoT event to be performed by the service technician with the files within the digital twin resources. Relevant data may include any files, information or data associated with the asset, asset part associated with the IoT event, the cost of the asset part associated with the IoT event, and the significance of the asset part (e.g., does the asset part affect the function or performance of the asset, and if so, how the asset part affects the function or performance of the asset).

Once relevant data associated with the asset is identified, the parsing engine may use a machine learning (ML) model to extract the context and information collected from the relevant data by utilizing natural language processing (NLP) techniques for textual data and visual recognition techniques for image data. More specifically, for NLP, an external engine may utilize an NLP technique (e.g., structure extraction, language identification, tokenization, decompounding, lemmatization/stemming, acronym normalization and tagging, entity extraction, phrase extraction) to process the collected textual data. Then, individual words, phrases, and/or sentences, as well as the relationships between the individual words, phrases and/or sentences, may be extracted from the processed textual data by utilizing various extraction approaches (e.g., top down, bottoms up, statistical). As a result, the digital twin event identification program 110a, 110b may interpret the context and meaning for the words, phrases and/or sentences collected by the textual data.

With image data, the parsing engine may utilize one or more image recognition and processing tools (e.g., convolutional neural networks (CNNs), pattern recognition) to identify objects shown in an image (e.g., diagram). In various image recognition and processing tools, an image may be broken down in a number of tiles that is individually analyzed, or classified into objects or classes based on features, to determine the identity of the objects presented in the image.

The digital twin event identification program 110a, 110b may analyze the identified and extracted relevant data to determine the urgency score of the IoT event. The urgency score (e.g., normalized quantity ranging from 0-1, 0-10, 0-100) may computed for each IoT event. In at least one embodiment, the urgency score may be generated as a percentage (e.g., normalized quantity ranging from 0-100%). The higher the urgency score (e.g., numeric value or percentage), the more significant the IoT event (e.g., IoT Event A with a 5.9 out of 10 urgency score will be considered less significant than IoT Event B with a 8.7 out of 10 urgency score). For example, the asset manual indicates that when the check engine light appears on the dashboard of a vehicle, without any obvious changes in the performance of the vehicle, then a gas cap may be loose. The digital twin event identification program 110a, 110b further computes the urgency score for the IoT event as a seven out of 10, since the gas cap directly relates to the performance of the engine and average cost for a gas cap replacement may range from $69 and $80 with parts and labor costs.

In some embodiments, the manufacturer of the asset may set the urgency score for each asset part based on the average cost of repairs and/or replacement in the industry (e.g., the average cost may include a range of costs that may vary based on location), and the significance of the asset part to the performance of the asset. In at least one embodiment, the manufacturer of the asset may periodically modify the urgency score for an asset part in which the digital twin event identification program 110a, 110b may prompt (e.g., via dialog box) the digital twin owner that the urgency score may be modified based on modifications made by the manufacturer. In at least some other embodiments, the digital twin event identification program 110a, 110b may be automatically modify the digital twin resources to include the modifications made by the manufacturer.

Continuing the previous example, the digital twin event identification program 110a, 110b receives an abrupt change in the readings generated by the temperature and water presence sensors in which the temperature in Chiller A dropped more than 15 degrees Fahrenheit and the water presence sensors reported more than three quarts of water present on the bottom of Chiller A within the past ten minutes. The digital twin event identification program 110a, 110b then utilizes a parsing engine to search the documents associated with troubleshooting issues, namely sudden change in temperature and water presence, to identify the possible issues that caused the IoT event. The parsing engine transmits a list of possible issues that range from $0 (include closing an open door of Chiller A) to $2,000 (include malfunction of the generator of Chiller A) to the digital twin event identification program 110a, 110b. Due to the sudden change in temperature and water presence sensors and the possible issues and corresponding costs that may cause the IoT event, the digital twin event identification program 110a, 110b computes a criticality score of 91 out of 100.

Then, at 206, the digital twin event identification program 110a, 110b determines whether the IoT event matches the owner preference. Based on the digital twin retrieved by the digital twin event identification program 110a, 110b, the digital twin event identification program 110a, 110b may utilize a search engine to parse through (or lookup on) the set of owner preferences to determine whether the IoT event matches a previously determined rule by the digital twin owner.

Continuing the previous example, the digital twin event identification program 110a, 110b utilize a search engine to parse through the owner preferences and determines that the IoT event of sudden change in the temperature and water presence sensors matches one of the owner preferences.

If the digital twin event identification program 110a, 110b determines that the IoT event does not match the owner preference at 206, then a default choice is set at 208. The digital twin event identification program 110a, 110b may prompt the user or a digital specialist (e.g., via a dialog box) to indicate that the IoT event fails to match the owner preference, and may further indicate that the digital twin event identification program 110a, 110b may proceed with the previously set default choice. In at least one embodiment, prior to the digital twin event determination process 200, the digital twin owner may select one or more default choices when the IoT event fails to match a rule associated with the owner preferences. For example, the default choices will include saving the data associated with the IoT event in a traditional database.

In another embodiment, the digital twin event identification program 110a, 110b may prompt (e.g., via a dialog box) to a digital specialist to analyze the IoT sensor event that occurred and the rule generated. The digital specialist may be further prompted (e.g., via an expanded dialog box) to present an independent decision for the digital twin event identification program 110a, 110b to determine how to handle or process the IoT event. Based on the independent decision provided by the digital specialist, the digital twin event identification program 110a, 110b may proceed accordingly. For example, if the digital specialist decides that the digital twin event identification program 110a, 110b should ignore the IoT event, then the digital specialist will include that decision in the expanded dialog box. The digital twin event identification program 110a, 110b will then proceed to ignore the IoT event.

In at least one other embodiment, the digital twin event identification program 110a, 110b may automatically prompt (e.g., via a dialog box) the digital specialist or owner, if the criticality score associated with the IoT event is considered high (e.g., above 50%, or 0.5 out of 1.0, or 5 out of 10, or 50 out of 100). The digital specialist or owner may then provide an independent decision, and may elect to save the IoT event on a blockchain structure, or a traditional database.

In at least one embodiment, the independent decision, or default choices, may be saved in an alternate storage medium or a traditional database for future similar IoT events. The traditional database or alternative storage medium, included in the default choice or after an independent decision is provided, may be periodically reviewed manually by the digital twin owner or another authorized person, or reviewed automatically by the digital twin event identification program 110a, 110b to determine whether the one or more rules associated with the owner preferences should be deleted, modified, and/or added.

Continuing the previous example, if the owner preferences fail to include a sudden change in the temperature and water presence sensors, then the digital twin event identification program 110a, 110b perform the default choice which is the save the IoT event in the traditional database. However, due to the high criticality score of the IoT event, the digital twin event identification program 110a, 110b will also prompt the digital specialist or owner of the IoT event to solicit an independent decision.

If, however, the digital twin event identification program 110a, 110b determines that a rule matches the owner preference at 206, then the preferred capture decision is performed at 210. The digital twin event identification program 110a, 110b may prompt the user or a digital specialist (e.g., via a dialog box) to indicate that the IoT event matches a rule associated with the owner preference. The digital twin event identification program 110a, 110b may then proceed with performing the preferred capture decision based on the rule.

In at least one embodiment, the rule may include notifying one or more service technicians from a previously determined list of approved vendors and/or service person that an IoT event has occurred on the asset by issuing a work order. In one embodiments, the technician may retrieve or review the work order with an enterprise asset management (EAM) tool (e.g., Maximo® (Maximo and all Maximo-based trademarks and logos are trademarks or registered trademarks of International Business Machines Corporation and/or its affiliates)) based on the technician preferences associated with the type of physical asset and specific model numbers or years associated with a physical asset.

In some embodiments, based on the criticality score, the digital twin event identification program 110a, 110b may limit the number of notified service technicians based on various factors including the current location of the service technician, past history of responsive times (e.g., service technicians with shorter responsive times to previous notifications will be notified vs. service technicians with historically longer responsive times), success rates to similar IoT events or similar assets (e.g., service technicians with a higher percentage of success rates to similar IoT events or similar assets), and other factors that directly or indirectly predicts the greater likelihood of handling the IoT event in a shorter period of time with a high success rate.

In at least one embodiment, the digital twin event identification program 110a, 110b may determine a higher percentage of success rates by comparing the amount of successfully addressed IoT events for similar assets or similar IoT events for each service technician from the previously determined list of approved vendors and/or service person with each other. The service technicians may then be sorted or ranked based on which service technicians have a greater amount of successfully addressed IoT events for similar IoT events and/or similar assets.

In some embodiments, the digital twin event identification program 110a, 110b may elect to record normal operating events based on owner preferences with a traditional database, and may record abnormal events within a blockchain structure to show evidence building up to the eventual IoT event (e.g., failure or replacement of asset part).

In other embodiments, the digital twin event identification program 110a, 110b may determine that the IoT event matches at least one of the owner preferences associated with the physical asset. Therefore, the digital twin event identification program 110a, 110b may qualify the IoT event as a major event. Then, based on one or more default choices in which the major events are saved to a blockchain structure, the IoT event, which qualified as a major event, may be saved to a blockchain structure.

Continuing the previous example, a sudden change in temperature and water presence sensors was included in the owner preferences in which the rule indicates that a work order should be immediately issued for a service technician to address. In addition to the high criticality score, the IoT event should be written on a blockchain structure.

Figure 3:
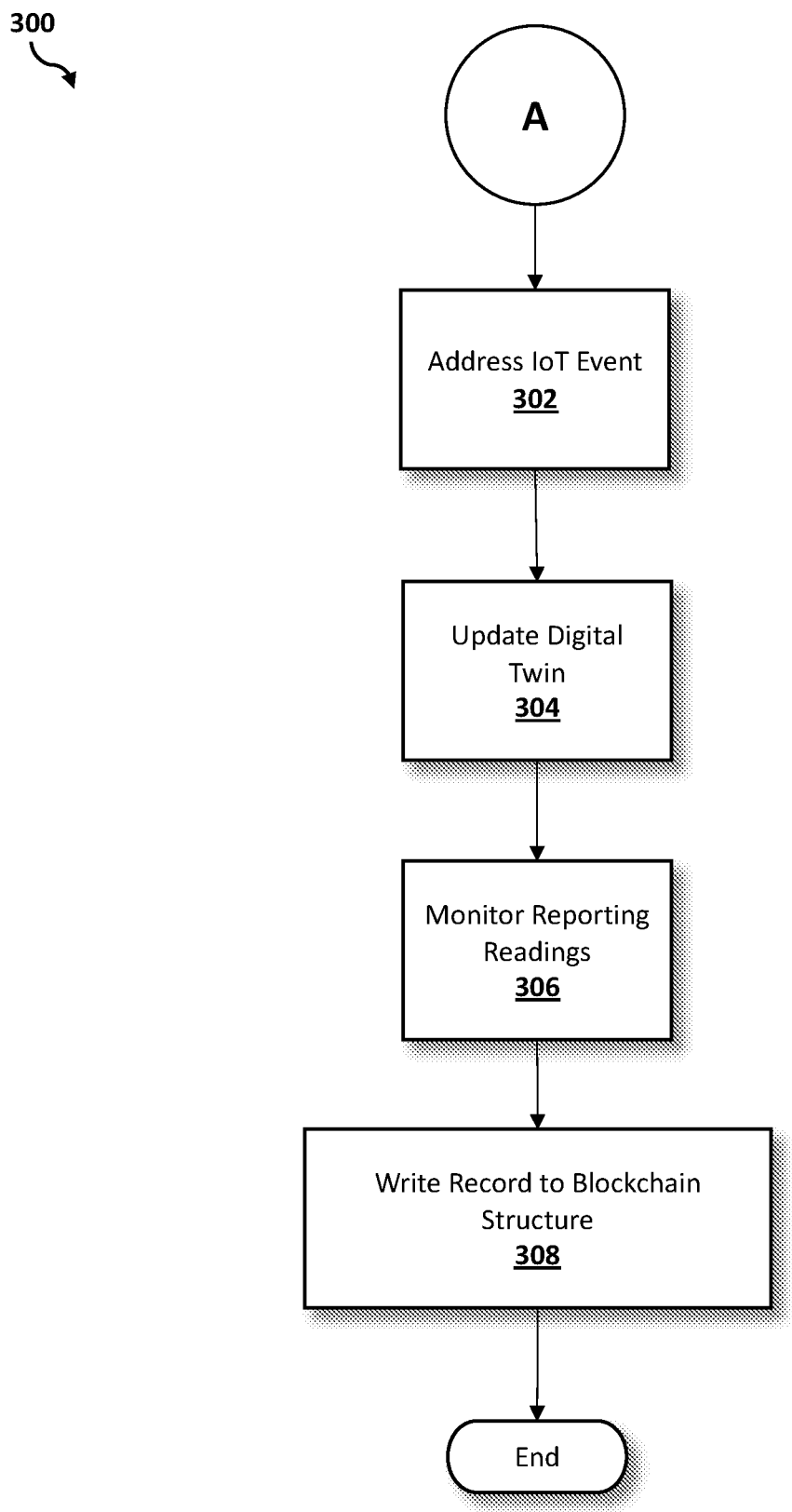
FIG. 3 is an operational flowchart illustrating a process for updating a blockchain structure associated with a digital twin according to at least one embodiment.

Referring now to FIG. 3, an operational flowchart illustrating the exemplary digital twin blockchain updating process 300 used by the digital twin event identification program 110a, 110b according to at least one embodiment is depicted.

At 302, an IoT event is addressed. The IoT event may be addressed by a service technician address the one or more issues identified (e.g., replace an asset part, remove an asset part, service and/or fix an asset part, decommission the asset) in the IoT event. One or more service technicians from the previously determined list of approved vendors and/or service persons may be notified of the IoT event by an issued work order. The work order may include the criticality score, a description of issues identified based on the IoT event, and a set of instructions for the service technician to follow to accept the work order. Once the service technician accepts the work order, then the service technician may be prompted (e.g., via dialog box) to indicate whether the service technician will be addressing the IoT event.

In at least one embodiment, if another service technician has already accepted the work order and will be addressing the IoT event, then the digital twin event identification program 110a, 110b may either prevent other service technicians from accept the work order, or indicating that the other service technician may address the IoT event, by prompting the other service technicians that the work order is no longer available, or that another service technician has already been assigned to the work order.

Before the service technician starts to address the IoT event, the service technician may scan the tag located on the asset by using a mobile device with a scanning device. The scan may then read the encryption key and alert the digital twin associated with the asset that the service technician has begun to service the asset, as well as pull up digital twin associated with the asset.

From the time that the service technician indicates that the service technician will address the IoT event thereby assigning the service technician to the work order to the time that the service technician begins to service the asset, and until the digital twin event identification program 110a, 110b receives a notification that the service technician has completed the work order, the digital twin event identification program 110a, 110b may track the time. In at least one embodiment, the service technician may indicate completion of the work order by scanning the tag associated with the asset. In at least one other embodiment, the service technician may turn on the asset to indicate completion of the work order. In some embodiments, the service technician may manually transmit, via a communication network 116, the steps performed by the service technician, in order to address the IoT event, to the digital twin event identification program 110a, 110b.

In the present embodiment, if the service technician fails to successfully address the IoT event associated with the asset, then the service technician may scan the tag associated with the asset, and manually indicate that the asset is still malfunctioning or not properly functioning. The digital twin event identification program 110a, 110b may then prompt (e.g., via a dialog box) the service technician to indicate the steps taken by the service technician to address the IoT event. The service technician may further indicate any additional recommendations (e.g., decommission the asset, order additional asset parts, contact the manufacturer or another specialist). The digital twin event identification program 110a, 110b may then prompt (e.g., a dialog box) the digital specialist or digital twin owner to determine whether to accept or reject the recommendations of the service technician, or to issue another work order for the IoT event for another service technician to address the IoT event.

In another embodiment, the service technician may include any personal observations made by the service technician while addressing the IoT event (e.g., any asset part should be serviced shortly, the asset should be placed in a different location to prevent any further malfunctions or performance interruptions).

Continuing the previous example, Service Technician A reviewed and accepted Work Order A generated for the sudden change in the temperature and water presence sensors on Chiller A, and was assigned to Work Order A. Once Service Technician A reaches Chiller A, Service Technician A scans the tag on Chiller A, which reads the encryption key and alerts Digital Twin A that Service Technician A is currently servicing Chiller A, as well as pulls up the digital twins associated with Chiller A. Service Technician A after reviewing the past service history, notices that the a large portion of the seal on the door of Chiller A was missing. As such, Service Technician A replaces the missing seal on the door of Chiller A. Service Technician A then restarts Chiller A.

Next, at 304, the digital twin is updated. The digital twin, which includes data associated with asset, may be updated to include the information provided by the service technician (e.g., steps utilized to address the IoT event, any additional recommendations, any personal observations, time and service technician that addressed the IoT event). The digital twin may be stored in the digital twin repository (e.g., database 114) for future reference.

Continuing the previous example, the Service Technician A then manually updates the digital twin may manually inputting the steps used to address the sudden change in temperature and water presence sensors, which includes replaces the missing seal on the door of Chiller A. Service Technician A further recommended that the Chiller A should undergone a quarterly servicing since Service Technician observes some abnormal sounds coming from Chiller A that may predict future failures of Chiller A.

Then, at 306, the reporting readings are monitored. The digital twin event identification program 110a, 110b may simultaneously restart reporting readings associated with the IoT sensors from the asset, when the digital twin is updated.

In at least one other embodiment, the digital twin event identification program 110a, 110b may simultaneously restart reporting readings associated with the IoT sensors from the asset, when the service technician indicates that the IoT event is addressed.

In the present embodiment, the IoT sensors associated with the asset may be paused when the digital twin event identification program 110a, 110b identifies that an IoT event associated with the asset has occurred at 204. Either an update to the digital twin, or an indication that the IoT event has been addressed, by the service technician may triggering the restart of the reporting readings. The readings from the IoT sensors may indicate whether the service performed on the asset addressed the issue that caused the IoT event (e.g., the asset begins to function as normal).

In at least one embodiment, if the reporting readings are unable to restart (e.g., due to performance issues with the asset), then the IoT sensors may transmit a signal (e.g., alert or error message) to the digital twin event identification program 110a, 110b via the communications network 116 to indicate that the IoT sensors are unable to restart reporting readings. The digital twin event identification program 110a, 110b may then prompt (e.g., via a dialog box) the digital twin owner that an error message was received by the IoT sensors. The digital twin owner may manually analyze the digital twin, contact the service technician who addressed the IoT event, or perform other tasks to determine the reason for the reporting readings not restarting.

Continuing the previous example, when Chiller A was restarted the reporting sensor readings were restarted, and the sensor readings transmitted normal operation readings to the digital twin event identification program 110a, 110b, with a gradual increase in the temperature of Chiller A, and a gradual decrease in the water present at the bottom of Chiller A.

Then, at 308, a record is written to a blockchain structure. Blockchain technology may include a shared log of events that are kept in blocks of data that may be passed to the next transaction in a linear order. A block may contain the data of one or more records or transactions. A block may hold or store the data before the block has been completed, prior to consensus and prior to being transferred to the next block in a blockchain, for example, using a transaction pool, a memory pool or a candidate block. A block may also be a block of one or more records or transactions attached to a blockchain, for example, a transaction that has been permanently appended and recorded to the files in a blockchain.

With blockchain technology, for example, when a transaction is written into a ledger, there may be a mechanism to make sure all the records are synchronized and if the network system detects an error, the error may be immediately corrected. Blockchain systems are immutable since, for example, a hash value on each block may be created and any change or amendment in data will show a different hash value. Each block may contain the hash of the previous block and the current transactions before the next hash may be created. Once consensus is reached, the data may be verified. Each block may have a hash value of the previous block in the chain and there may be no way to modify the data in the previous block. If the data is modified, the modified data may be detected by a re-calculated hash value. A different hash value may show that the network system has been compromised.

The digital twin event identification program 110a, 110b may write a record associated with the addressed IoT event and the asset onto a blockchain structure. The record may include, the asset part removed (e.g., some asset parts that are individually addressable are no longer reporting a presence), added asset parts (e.g., a new IoT sensor is now reporting), the time that the asset was decommissioned, and optionally information associated with the steps performed, service technician details (e.g., date and time of service, contact information, company/vendor associated with the service technician, time that service technician was at location), and symptoms exhibited by the asset prior to the IoT event being addressed (e.g., sensor readings immediately before the IoT event occurred).

In the present embodiment, the digital twin event identification program 110a, 110b may utilize the criticality score to determine whether a record should be written on the blockchain structure for the IoT event. For example, if the criticality score is high, then the digital twin event identification program 110a, 110b will elect to the write a record associated with the IoT event on the blockchain structure.

Continuing the previous example, the digital twin event identification program 110a, 110b determines that the IoT event should be written on a record and saved to the blockchain structure as an abnormal event associated with Chiller A. The record includes Service Technician A's observations on the abnormal sounds from the back of Chiller A, the replacement of the missing seal on the door of Chiller A, and the details associated with the IoT event, namely the sudden change in the temperature and water presence sensors readings, and the criticality score.

The digital twin event identification program 110a, 110b may improve the functionality of the computer, the technology and/or the field of technology by utilizing IoT sensor events to determine whether the event qualifying as a minor or major event that should be captured and stored in a blockchain structure, or saved within a traditional database. The digital twin event identification program 110a, 110b may further trigger the writing of a new block within a digital twin blockchain structure upon the completion of a maintenance or part service request using IoT sensor readings. The digital twin event identification program 110a, 110b may further determine that the captured event has exceeded one of the plurality of thresholds and whether any event qualifies as a minor or major event that should be captured and stored on the blockchain as opposed to saved and/or stored within a traditional database.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
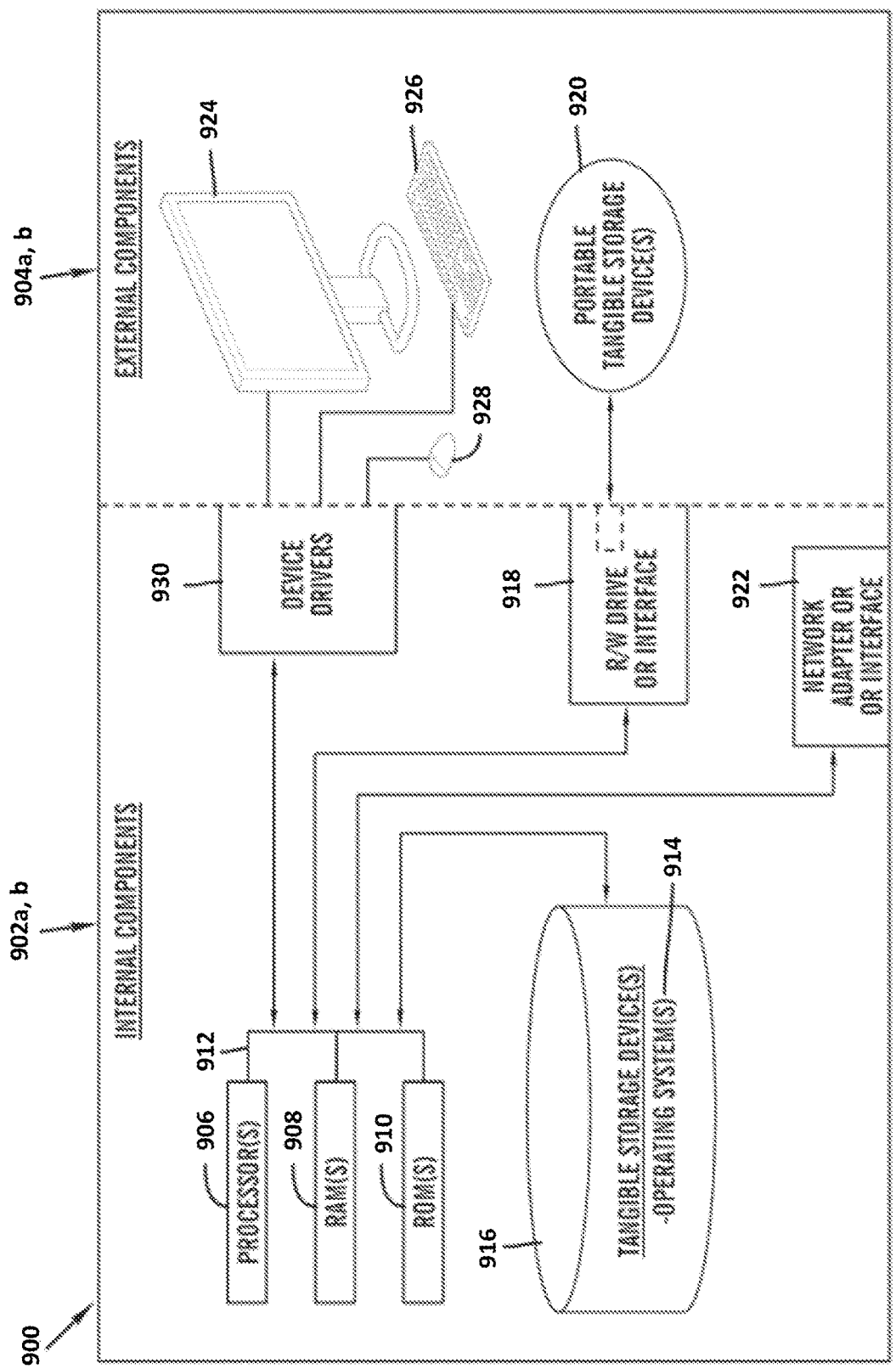
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the digital twin event identification program 110a in client computer 102, and the digital twin event identification program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the digital twin event identification program 110a, 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the digital twin event identification program 110a in client computer 102 and the digital twin event identification program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the digital twin event identification program 110a in client computer 102 and the digital twin event identification program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
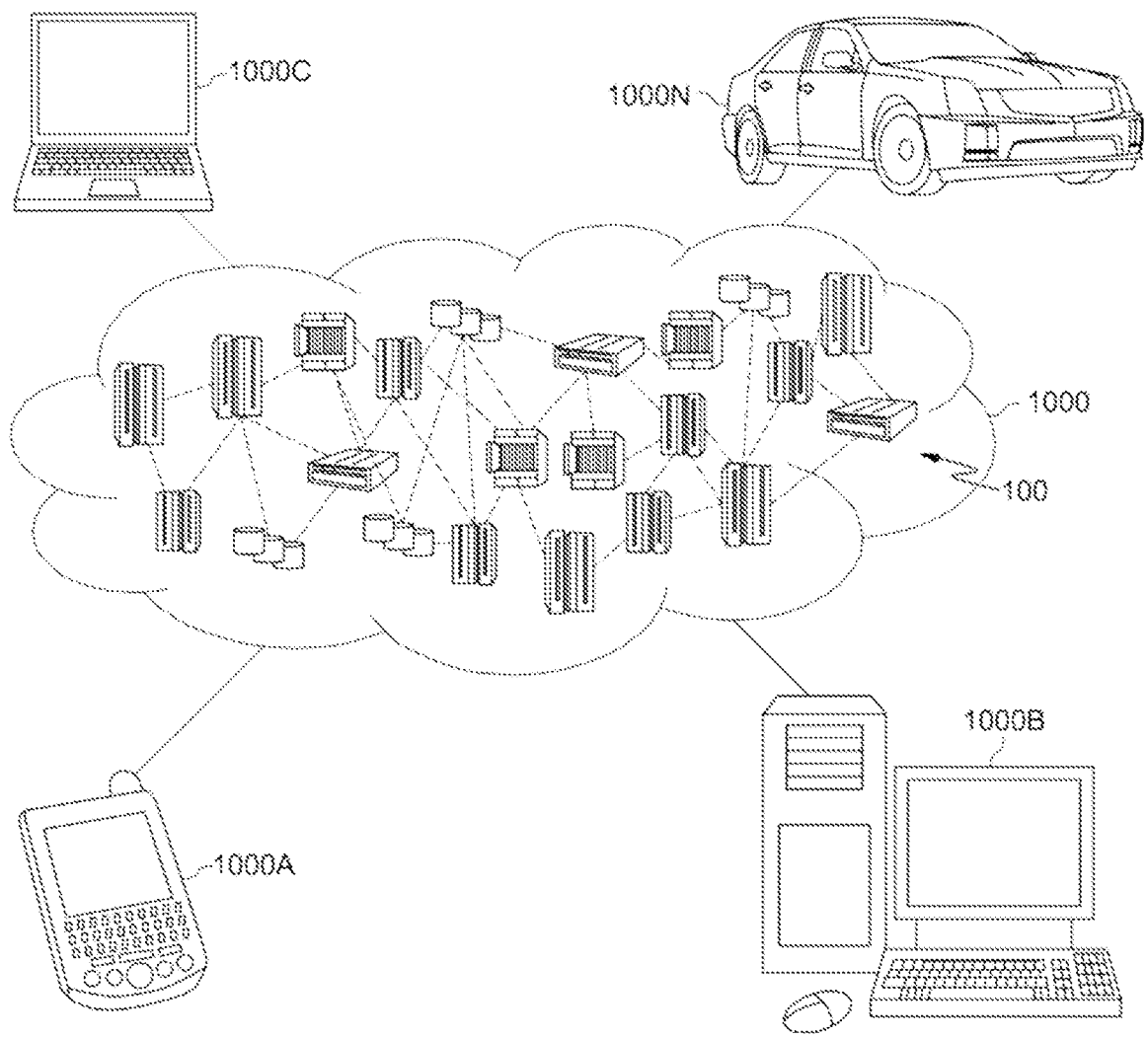
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
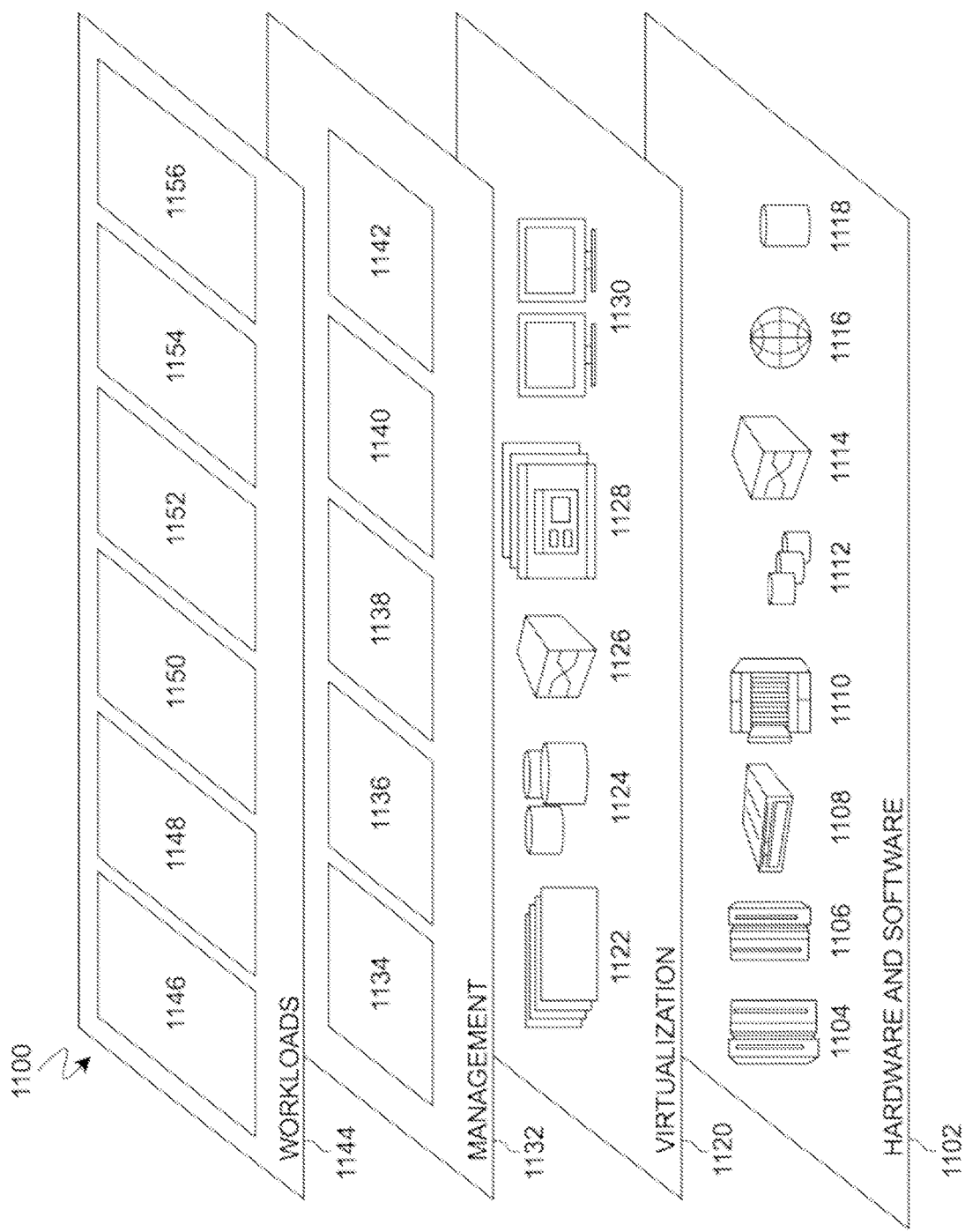
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and digital twin event identification 1156. A digital twin event identification program 110a, 110b provides a way to classify an IoT event as minor or major, and further determine whether to store the IoT event in a blockchain structure, or a traditional database.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   detecting an Internet of Things (IoT) event by utilizing one or more IoT sensors associated with a physical asset;

comparing the detected IoT event with one or more owner preferences associated the physical asset;

qualifying the compared IoT event as a major event based on the detected IoT event matching the one or more owner preferences; and computing an urgency score for each detected IoT event based on an average cost of repairs for one or more asset parts associated with the detected IoT event or a level of significance associated with the one or more asset parts associated with the detected IoT event.

2. The method of claim 1, further comprising:

in response to determining that the compared IoT event fails to match the one or more owner preferences associated with the physical asset, qualifying the compared IoT event as a minor event; and performing one or more default choices, wherein the compared IoT event is saved in a traditional database.

3. The method of claim 1, wherein the IoT event is selected from a group consisting of:

(i) an on/off trigger;
(ii) a threshold IoT sensor reading;
(iii) an anomaly to a predicted sensor reading;
(iv) a location event; and
(v) a urgency score.

4. The method of claim 1, further comprising:

continuously monitoring the one or more IoT sensors associated with the physical asset, wherein the one or more IoT sensors are selected from a group consisting of:

(i) a current health status associated with the physical asset;
(ii) a current status of one or more asset parts associated with the physical asset;
(iii) an identifier of asset parts associated with the physical asset;
(iv) a historical usage of the physical asset;
(v) a predicted maintenance associated with the physical asset;
(vi) an anomaly associated with a performance of the physical asset;
(vii) any recommended preventive maintenance schedules;
(viii) any failure predictions associated with the physical asset; and
(ix) one or more digital twins associated with a function and the performance of the physical asset.

5. The method of claim 1, further comprising:

initiating one or more digital twins associated with the physical asset, wherein the one or more digital twins are captured to digitally mimic the IoT event of the physical asset.

6. The method of claim 1, further comprising:

in response to determining that the compared IoT event matches the one or more owner preferences associated with the physical asset, qualifying the compared IoT event as the major event; and performing one or more default choices, wherein the compared IoT event is saved to a blockchain structure.

7. The method of claim 1, further comprising:

in response to determining that the compared IoT event fails to match the one or more owner preferences associated with the physical asset, qualifying the compared IoT event as a minor event;

requesting an independent decision from a digital specialist to determine how to treat the IoT event, wherein a urgency score associated with IoT event is considered high; and in response to receiving the independent decision from the digital specialist, performing an action associated with the IoT event based on the received independent decision.

8. A computer system for qualifying an Internet of Things (IoT) event as a major event, comprising:

one or more processors, one or more computer-readable memories, one or more non-transitory computer-readable tangible storage media, and program instructions stored on at least one of the one or more non-transitory computer-readable tangible storage media for execution by at least one of the one or more processors via at least one of the one or more computer-readable memories, wherein the computer system is capable of performing a method comprising:

detecting an Internet of Things (IoT) event by utilizing one or more IoT sensors associated with a physical asset;

comparing the detected IoT event with one or more owner preferences associated the physical asset;

qualifying the compared IoT event as a major event based on the detected IoT event matching the one or more owner preferences; and computing an urgency score for each detected IoT event based on an average cost of repairs for one or more asset parts associated with the detected IoT event or a level of significance associated with the one or more asset parts associated with the detected IoT event.

9. The computer system of claim 8, further comprising:

in response to determining that the compared IoT event fails to match the one or more owner preferences associated with the physical asset, qualifying the compared IoT event as a minor event; and performing one or more default choices, wherein the compared IoT event is saved in a traditional database.

10. The computer system of claim 8, wherein the IoT event is selected from a group consisting of:

(i) an on/off trigger;
(ii) a threshold IoT sensor reading;
(iii) an anomaly to a predicted sensor reading;
(iv) a location event; and
(v) a urgency score.

11. The computer system of claim 8, further comprising:

continuously monitoring the one or more IoT sensors associated with the physical asset, wherein the one or more IoT sensors are selected from a group consisting of:

(i) a current health status associated with the physical asset;
(ii) a current status of one or more asset parts associated with the physical asset;
(iii) an identifier of asset parts associated with the physical asset;
(iv) a historical usage of the physical asset;
(v) a predicted maintenance associated with the physical asset;
(vi) an anomaly associated with a performance of the physical asset;
(vii) any recommended preventive maintenance schedules;
(viii) any failure predictions associated with the physical asset; and
(ix) one or more digital twins associated with a function and the performance of the physical asset.

12. The computer system of claim 8, further comprising:
initiating one or more digital twins associated with the physical asset, wherein the one or more digital twins are captured to digitally mimic the IoT event of the physical asset.

13. The computer system of claim 8, further comprising:
in response to determining that the compared IoT event matches the one or more owner preferences associated with the physical asset, qualifying the compared IoT event as the major event; and
performing one or more default choices, wherein the compared IoT event is saved to a blockchain structure.

14. The computer system of claim 8, further comprising:
in response to determining that the compared IoT event fails to match the one or more owner preferences associated with the physical asset, qualifying the compared IoT event as a minor event;
requesting an independent decision from a digital specialist to determine how to treat the IoT event, wherein a urgency score associated with IoT event is considered high; and
in response to receiving the independent decision from the digital specialist, performing an action associated with the IoT event based on the received independent decision.

15. A computer program product for qualifying an Internet of Things (IoT) event as a major event, comprising:
one or more non-transitory computer-readable tangible storage media and program instructions stored on at least one of the one or more non-transitory computer-readable tangible storage media, the program instructions executable by a processor to cause the processor to perform a method comprising:
detecting an Internet of Things (IoT) event by utilizing one or more IoT sensors associated with a physical asset;
comparing the detected IoT event with one or more owner preferences associated the physical asset;
qualifying the compared IoT event as a major event based on the detected IoT event matching the one or more owner preferences; and
computing an urgency score for each detected IoT event based on an average cost of repairs for one or more asset parts associated with the detected IoT event or a level of significance associated with the one or more asset parts associated with the detected IoT event.

16. The computer program product of claim 15, further comprising:
in response to determining that the compared IoT event fails to match the one or more owner preferences associated with the physical asset, qualifying the compared IoT event as a minor event; and
performing one or more default choices, wherein the compared IoT event is saved in a traditional database.

17. The computer program product of claim 15, wherein the IoT event is selected from a group consisting of:
(i) an on/off trigger;
(ii) a threshold IoT sensor reading;
(iii) an anomaly to a predicted sensor reading;
(iv) a location event; and
(v) a urgency score.

18. The computer program product of claim 15, further comprising:
continuously monitoring the one or more IoT sensors associated with the physical asset, wherein the one or more IoT sensors are selected from a group consisting of:
(i) a current health status associated with the physical asset;
(ii) a current status of one or more asset parts associated with the physical asset;
(iii) an identifier of asset parts associated with the physical asset;
(iv) a historical usage of the physical asset;
(v) a predicted maintenance associated with the physical asset;
(vi) an anomaly associated with a performance of the physical asset;
(vii) any recommended preventive maintenance schedules;
(viii) any failure predictions associated with the physical asset; and
(ix) one or more digital twins associated with a function and the performance of the physical asset.

* * * * *